United States Patent
Tanimoto

(10) Patent No.: US 8,606,941 B2
(45) Date of Patent: Dec. 10, 2013

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 920 days.

(21) Appl. No.: 12/103,933

(22) Filed: Apr. 16, 2008

(65) Prior Publication Data

US 2008/0275945 A1    Nov. 6, 2008

(30) Foreign Application Priority Data

May 2, 2007 (JP) ................... 2007-121858
Jun. 7, 2007 (JP) ................... 2007-152118

(51) Int. Cl.
*G06F 15/16* (2006.01)

(52) U.S. Cl.
USPC ........... 709/229; 709/203; 709/214; 709/221; 709/223

(58) Field of Classification Search
USPC .......................... 709/229, 203, 214, 221, 223
See application file for complete search history.

(56) References Cited

U.S. PATENT DOCUMENTS

| | | | |
|---|---|---|---|
| 6,898,641 B1 | 5/2005 | Kobayashi | |
| 7,206,088 B2 | 4/2007 | Tanimoto | |
| 7,647,388 B2 | 1/2010 | Kato | |
| 7,797,642 B1 * | 9/2010 | Karam et al. | 715/810 |
| 8,065,418 B1 | 11/2011 | Abuan et al. | |
| 2002/0059436 A1 | 5/2002 | Kubo | |
| 2002/0143956 A1 | 10/2002 | Tanimoto | |
| 2002/0146002 A1 | 10/2002 | Sato | |
| 2002/0156875 A1 * | 10/2002 | Pabla | 709/220 |
| 2003/0140637 A1 | 7/2003 | Masui et al. | |
| 2003/0144872 A1 | 7/2003 | Masui et al. | |
| 2004/0078426 A1 | 4/2004 | Nagami et al. | |
| 2004/0148432 A1 | 7/2004 | Udono et al. | |
| 2004/0172395 A1 | 9/2004 | Edelstein et al. | |
| 2004/0218611 A1 | 11/2004 | Kim | |
| 2005/0076098 A1 | 4/2005 | Matsubara et al. | |
| 2005/0138192 A1 * | 6/2005 | Encarnacion et al. | 709/230 |
| 2006/0083171 A1 | 4/2006 | Tanaike et al. | |
| 2006/0256771 A1 | 11/2006 | Yarlagadda | |
| 2006/0282540 A1 | 12/2006 | Tanimoto | |
| 2007/0016630 A1 * | 1/2007 | Samji et al. | 707/204 |
| 2007/0100980 A1 * | 5/2007 | Kataoka et al. | 709/223 |
| 2007/0115868 A1 * | 5/2007 | Chen et al. | 370/315 |
| 2007/0233844 A1 | 10/2007 | Tanimoto | |

(Continued)

FOREIGN PATENT DOCUMENTS

| | | |
|---|---|---|
| CN | 1481112 A | 3/2004 |
| JP | 04-105143 A | 4/1992 |

(Continued)

OTHER PUBLICATIONS

Tanimoto: "Relay Server and Relay Communication System," U.S. Appl. No. 12/335,642, filed Dec. 16, 2008.

(Continued)

*Primary Examiner* — Lan-Dai T Truong
(74) *Attorney, Agent, or Firm* — Keating & Bennett, LLP

(57) ABSTRACT

In a relay communication system, when receiving an operation instruction of a resource from a client terminal stored in an account information registration unit, a relay server relays the operation instruction to a client terminal capable of operating the resource based on relay group information if the resource is operable by another client terminal.

14 Claims, 13 Drawing Sheets

(56) References Cited

U.S. PATENT DOCUMENTS

| | | | |
|---|---|---|---|
| 2007/0274329 A1 | 11/2007 | Takeyoshi et al. | |
| 2008/0089349 A1 | 4/2008 | Tanimoto | |
| 2008/0137672 A1 | 6/2008 | Tanimoto | |
| 2008/0147825 A1 | 6/2008 | Tanimoto | |
| 2008/0256458 A1* | 10/2008 | Aldred et al. | 715/741 |
| 2008/0288591 A1 | 11/2008 | Tanimoto | |
| 2008/0298367 A1 | 12/2008 | Furukawa | |
| 2011/0022839 A1* | 1/2011 | Hair et al. | 713/165 |

FOREIGN PATENT DOCUMENTS

| | | |
|---|---|---|
| JP | 09-168055 A | 6/1997 |
| JP | 09-282216 A | 10/1997 |
| JP | 2000-059465 A | 2/2000 |
| JP | 2001-092702 A | 4/2001 |
| JP | 2001-292167 A | 10/2001 |
| JP | 2002-149519 A | 5/2002 |
| JP | 2002-199150 A | 7/2002 |
| JP | 2002-217943 A | 8/2002 |
| JP | 2002-247036 A | 8/2002 |
| JP | 2002-288415 A | 10/2002 |
| JP | 2002-314573 A | 10/2002 |
| JP | 2003-032310 A | 1/2003 |
| JP | 2004-139291 A | 5/2004 |
| JP | 2004-201255 A | 7/2004 |
| JP | 2004-213533 A | 7/2004 |
| JP | 2004-229299 A | 8/2004 |
| JP | 2004-265415 A | 9/2004 |
| JP | 2004-310371 A | 11/2004 |
| JP | 2005-027040 A | 1/2005 |
| JP | 2005-086520 A | 3/2005 |
| JP | 2005-115943 A | 4/2005 |
| JP | 2005-157699 A | 6/2005 |
| JP | 2005-267658 A | 9/2005 |
| JP | 2005-328239 A | 11/2005 |
| JP | 2006-033105 A | 2/2006 |
| JP | 2006-202218 A | 8/2006 |
| JP | 2006-268138 A | 10/2006 |
| JP | 2006-337021 A | 12/2006 |
| JP | 2006-343943 A | 12/2006 |
| JP | 2007-104440 A | 4/2007 |
| JP | 2007-265135 A | 10/2007 |
| JP | 2007-267136 A | 10/2007 |
| JP | 2007-310508 A | 11/2007 |
| JP | 2008-028600 A | 2/2008 |
| JP | 2008-092520 A | 4/2008 |
| JP | 2008-098699 A | 4/2008 |
| JP | 2008-098888 A | 4/2008 |
| JP | 2008-148046 A | 6/2008 |
| JP | 2008-148125 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| JP | 2010-178089 A | 8/2010 |
| JP | 2010-256989 A | 11/2010 |
| JP | 2010-267084 A | 11/2010 |
| JP | 2010-278636 A | 12/2010 |
| JP | 2011-055452 A | 3/2011 |
| JP | 2011-055453 A | 3/2011 |
| JP | 2011-055454 A | 3/2011 |
| JP | 2011-160103 A | 8/2011 |
| WO | 2006/090465 A1 | 8/2006 |

OTHER PUBLICATIONS

Tanimoto: "Relay Server and Relay Communication System," U.S. Appl. No. 12/335,661, filed Dec. 16, 2008.
Tanimoto: "Relay Server and Relay Communication System," U.S. Appl. No. 12/340,868, filed Dec. 22, 2008.
Shinji Okumura et al., SIP (session initiation protocol), Nikkei Communications, Sep. 22, 2003, pp. 150-158 (partial translation pp. 155-156 (Usable in IM and Presence Notification)).
Tanimoto, "Relay Server and Relay Communication System," U.S. Appl. No. 12/270,883, filed Nov. 14, 2008.
Tanimoto: "Relay-Server," U.S. Appl. No. 11/853,943, filed Sep. 12, 2007.
Tanimoto: "File Server Device," U.S. Appl. No. 11/862,654, filed Sep. 27, 2007.
Tanimoto: "File Transfer Server," U.S. Appl. No. 11/870,622, filed Oct. 11, 2007.
Tanimoto: "Relay Server, Relay Communication System, and Communication Device," U.S. Appl. No. 11/944,495, filed Nov. 23, 2007.
Tanimoto: "Relay Server and Client Terminal," U.S. Appl. No. 11/953,351, filed Dec. 10, 2007.
Tanimoto: "Relay Server and Relay Communication System," U.S. Appl. No. 11/953,505, filed Dec. 10, 2007.
Tanimoto: "Relay Server and Relay Communication System," U.S. Appl. No. 12/112,127, filed Apr. 30, 2008.
Tanimoto: "Relay Server and Relay Communication System," U.S. Appl. No. 12/107,793, filed Apr. 23, 2008.
Tanimoto, "Relay Server and Relay Communication System Arranged to Share Resources Between Networks." U.S. Appl. No. 13/153,497, filed Jun. 6, 2011.
Inai et al., "A Scalable Log Collecting Scheme for Host-Based Traffic Monitoring System," Information Processing Society of Japan Symposium Series, vol. 2008, No. 1, Jul. 2, 2008, 27 pages.
Tanimoto, "Relay Communication System and First Relay Server," U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S. Appl. No. 13/496,664, filed Mar. 16, 2012.
Tanimoto, "First Replay Server and Second Relay Server", U.S. Appl. No. 13/255,958, filed Sep. 12, 2011.
Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
English translation of Official Communication issued in corresponding Japanese Patent Application No. 2007-152122, mailed on Jun. 2, 2010.
Tanimoto, "Relay Server, Relay Communication System", U.S. Appl. No. 13/061,234, filed Feb. 28, 2011.
Tanimoto, "Relay Server, Relay Communication System, and Communication Apparatus", U.S. Appl. No. 13/061,725, filed Mar. 2, 2011.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.
Tanimoto, "Relay Server", U.S. Appl. No. 10/114,963, filed Apr. 2, 2002.

(56) References Cited

OTHER PUBLICATIONS

Tanimoto, "Relay Server, Network Device, Communication System, and Communication Method", U.S. Appl. No. 10/116,615, filed Apr. 2, 2002.

Tanimoto, "Relay Device and Communication System", U.S. Appl. No. 11/723,466, filed Mar. 20, 2007.

Official Communication issued in corresponding Japanese Patent Application No. 2007-339311, mailed on Apr. 8, 2011.

"Error & Warning Message Ways of Coping, Nikkei Personal Computer", Nikkei Business Publications, Inc., May 10, 2007.

Official Communication issued in corresponding European Patent Application No. 08007866.0, mailed on Apr. 19, 2011.

Tanimoto, "Relay Device and Communication System", U.S. Appl. No. 13/341,711, filed Dec. 30, 2011.

Official Communication issued in corresponding Chinese Patent Application No. 200810096102.2, mailed on Aug. 3, 2011.

* cited by examiner

FIG. 6

```
<?xml version="1.0" encoding="Shift_JIS" ?>
<root>
    <relay-group group-id="0001@relay-server1">
        <relay-account account="relay-server1@net" name="branch office A" />
        <relay-account account="relay-server2@net" name="branch office B" />
        <relay-account account="relay-server3@net" name="branch office C" />
    </relay-group>
    <relay-group group-id="0002@relay-server1">
        <relay-account account="relay-server1@net" name="branch office A" />
        <relay-account account="relay-server3@net" name="branch office C" />
    </relay-group>
</root>
```

FIG. 7

```xml
<?xml version="1.0" encoding="Shift_JIS" ?>
<root>
    <relay-group group-id="0001@relay-server1">
        <relay-account account="relay-server1@net" name="branch office A">
            <user-account account="user1A@relay-server1.net" name="terminal1A" group="0001" />
        </relay-account>
        <relay-account account="relay-server2@net" name="branch office B">
            <user-account account="user2A@relay-server2.net" name="terminal2A" group="0002" />
        </relay-account>
        <relay-account account="relay-server3@net" name="branch office C">
            <user-account account="user3A@relay-server3.net" name="terminal3A" group="0003" />
        </relay-account>
    </relay-group>
    <relay-group group-id="0002@relay-server1">
        <relay-account account="relay-server1@net" name="branch office A">
            <user-account account="user1A@relay-server1.net" name="terminal1A" group="0001" />
        </relay-account>
        <relay-account account="relay-server3@net" name="branch office C">
            <user-account account="user3A@relay-server3.net" name="terminal3A" group="0003" />
            <user-account account="user3B@relay-server3.net" name="terminal3B" group="0003" />
        </relay-account>
    </relay-group>
</root>
```

```
<?xml version="1.0" encoding="Shift_JIS" ?>                                                              ─ 121
<user-account account="user1A@relay-server1.net" >
 <policy name="user1A-policy01" policy-id="20061001150032user1A@relay-server1.net" >                     ─ 122
  <family-account-info>                                                                                  ─ 123
   <user-account account="user1A@relay-server1.net" />  ⎫
   <user-account account="user2A@relay-server2.net" />  ⎬ 124
   <user-account account="user3A@relay-server3.net" />  ⎭
  </family-account-info>
  <family-resource-info>
   <resource name="folderA" owner="user1A@relay-server1.net" value="c:/folderA" />          ⎫
    <resource name="file001.xls" owner="user1A@relay-server1.net" value="c:/folderA/file001.xls" />  ⎬ 125
    <resource name="file002.doc" owner="user1A@relay-server1.net" value="c:/folderA/file002.doc" />  ⎪
   </resource>                                                                                       ⎪
   <resource name="file003.pdf" owner="user1A@relay-server1.net" value="c:/folderB/file003.pdf" />   ⎭
  </family-resource-info>
 </policy>
</user-account>
```

126, 126 (labels on resource entries)

RELAY SERVER AND RELAY COMMUNICATION SYSTEM

CROSS-REFERENCE TO RELATED APPLICATIONS

This application claims priority under 35 U.S.C. 119 to Japanese Patent Application No. 2007-121858, filed on May 2, 2007 and Japanese Patent Application No. 2007-152118, filed on Jun. 7, 2007, which applications are hereby incorporated by reference in their entirety.

BACKGROUND OF THE INVENTION

1. Field of the Invention

The present invention mainly relates to a configuration of a relay server that enables communication between terminals.

2. Description of the Related Art

A communication technique referred to as VPN (Virtual Private Network) is known (see, e.g., Japanese Laid-Open Patent Publication No. 2002-217938). The VPN is utilized to communicate between terminals connected to a LAN (Local Area Network) of a plurality of branch offices (base points) provided in each of the regions over the Internet. Through the use of the VPN, another LAN in a remote location can be used as if it is a directly connected network.

However, this type of system tends to be rigid in terms of virtually building the network, and it is not easy to build a system having expandability and flexibility. The communication system disclosed in Japanese Laid-Open Patent Publication No. 2002-217938 cannot be used to arbitrarily set, for every base point, a terminal that can actually exchange data at a terminal that cannot exchange data between the base points at either base point.

SUMMARY OF THE INVENTION

In order to overcome the problems described above, preferred embodiments of the present invention provide a configuration capable of easily setting a terminal that can actually share or operate resources at the respective base point.

According to a first preferred embodiment of the present invention, a relay server having the following configuration is provided. The relay server preferably includes an account information registration unit, a relay group information registration unit, a resource sharable terminal information registration unit, and a shared resource information registration unit. The account information registration unit stores information of an account of a client terminal. The relay group information registration unit stores relay group information including information of each relay server configuring a relay group by permitting connection with each other. The resource sharable terminal information registration unit stores resource sharable terminal information including information of an account of a resource sharable terminal, which is a client terminal selected as a terminal capable of sharing a resource in the relay group. The shared resource information registration unit stores shared resource information. The shared resource information includes information of a resource held by the resource sharable terminal, and information of an account of a client terminal which is the resource sharable terminal in the relay group same as the resource sharable terminal that shares the resource. When receiving an operation instruction of the resource from the client terminal stored in the account information registration unit, the relay server relays the operation instruction to a client terminal capable of operating the resource based on the relay group information if the resource is operable by another client terminal.

According to such a configuration, the resource can be shared or operated between the client terminals stored in the account information registration unit of a different relay server. The resource sharing of various modes can be realized according to the application and the purpose since the client terminal that can exchange data/the client terminal that cannot exchange data can be arbitrarily set.

The relay server preferably has the following configuration. The resource sharable terminal in the relay group is configured to be changeable in a range of client terminals stored in the account information registration unit of the relay server. In time of change, the relay server updates the resource sharable terminal information stored in the resource sharable terminal information registration unit, and transmits a signal to another relay server configuring the relay group to update the resource sharable terminal information stored in the resource sharable terminal information registration unit.

According to such a configuration, the client terminal that carries out resource sharing can be freely changed in the range stored in the account information registration unit, whereby a relay communication network excelling in flexibility can be realized. When the change of resource sharable terminal is performed only in its own device, change is automatically reflected on other relay servers, and thus a plurality of relay servers do not need to be respectively operated. Therefore, the task of changing the resource sharable terminal is significantly simplified.

The relay server preferably has the following configuration. The relay group information registration unit is configured to store a plurality of relay group information. The resource sharable terminal information registration unit is configured to store the same client terminal as the resource sharable terminal in the plurality of relay groups.

According to such a configuration, a certain client terminal can be used while switching the relay group (i.e., terminal configuration that carries out resource sharing) according to a certain purpose or situation. Therefore, a highly convenient relay communication network can be realized.

According to a second preferred embodiment of the present invention, a relay communication system having the following configuration is provided. The relay communication system preferably includes a plurality of relay servers. Each relay server preferably includes an account information registration unit, a relay group information registration unit, a resource sharable terminal information registration unit, and a shared resource information registration unit. The account information registration unit stores information of an account of a client terminal. The relay group information registration unit stores relay group information including information of each relay server configuring a relay group by permitting connection with each other. The resource sharable terminal information registration unit stores resource sharable terminal information including information of an account of a resource sharable terminal, which is a client terminal selected as a terminal capable of sharing a resource in the relay group. The shared resource information registration unit stores shared resource information. The shared resource information includes information of a resource held by the resource sharable terminal, and information of an account of a client terminal which is the resource sharable terminal in the relay group same as the resource sharable terminal that shares the resource. When receiving an operation instruction of the resource from the client terminal stored in the account information registration unit, the relay server relays the operation instruction to a client terminal capable of operating the resource based on the relay group information if the resource is operable by another client terminal. A resource sharable terminal stored in the account information registration unit of a certain relay server then can indirectly operate a resource held by another resource sharable terminal.

According to such a configuration, the resource can be shared or operated between the client terminals stored in the account information registration unit of a different relay server. The resource sharing of various modes can be realized according to the application and the purpose since the client terminal that can exchange data/the terminal that cannot exchange data can be arbitrarily set.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 6 is a view showing content of relay group information.

FIG. 7 is a view showing content of relay group information added to resource sharable terminal information.

FIG. 8 is a view showing content of shared resource information.

DETAILED DESCRIPTION OF PREFERRED EMBODIMENTS

Figure 1:
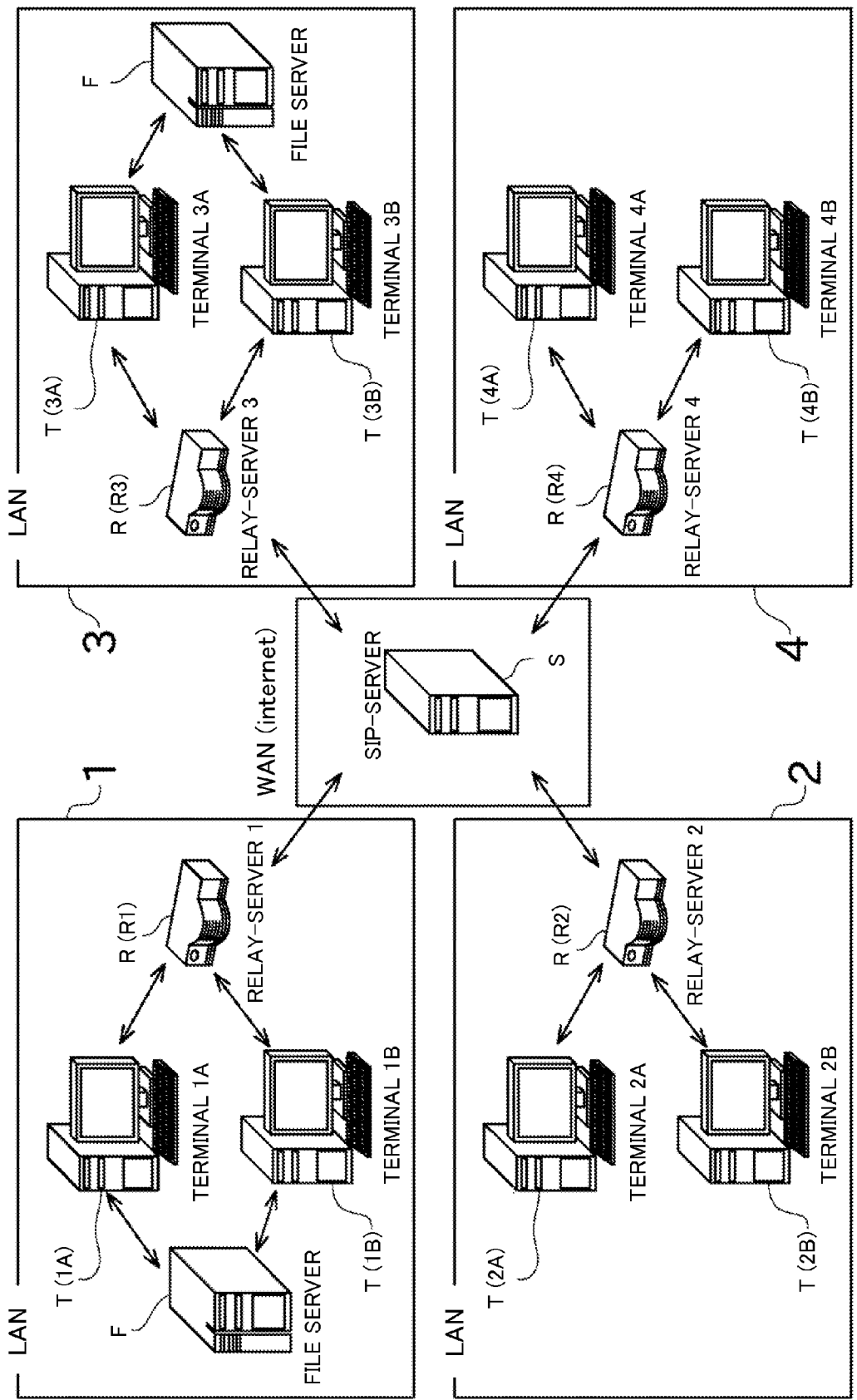
FIG. 1 is a network configuration of a relay communication system according to a preferred embodiment of the present invention.

The preferred embodiments of the present invention will now be described with reference to the drawings. FIG. 1 is an explanatory view showing an overall configuration of a relay communication system according to a preferred embodiment of the present invention.

As shown in FIG. 1, the relay communication system is defined by a plurality of LANs connected to a WAN (Wide Area Network) The relay communication system includes an external server S, a relay server R, a client terminal T, a file server F, and the like.

The WAN is a network for connecting different LANs to each other. In the present preferred embodiment, the Internet is preferably used as the WAN.

The LAN is a relatively small-scale network provided in a limited location. A plurality of LANs exist, each provided at a physically remote location. In the present preferred embodiment, there is considered a case where the LAN 1 is provided at the Tokyo branch office, and LANs 2, 3, 4 are respectively provided at the Osaka branch office, the Nagoya branch office, and the Fukuoka branch office, for example. The four LANs 1, 2, 3, and 4 are respectively connected to the Internet, which is a global network.

Figure 2:
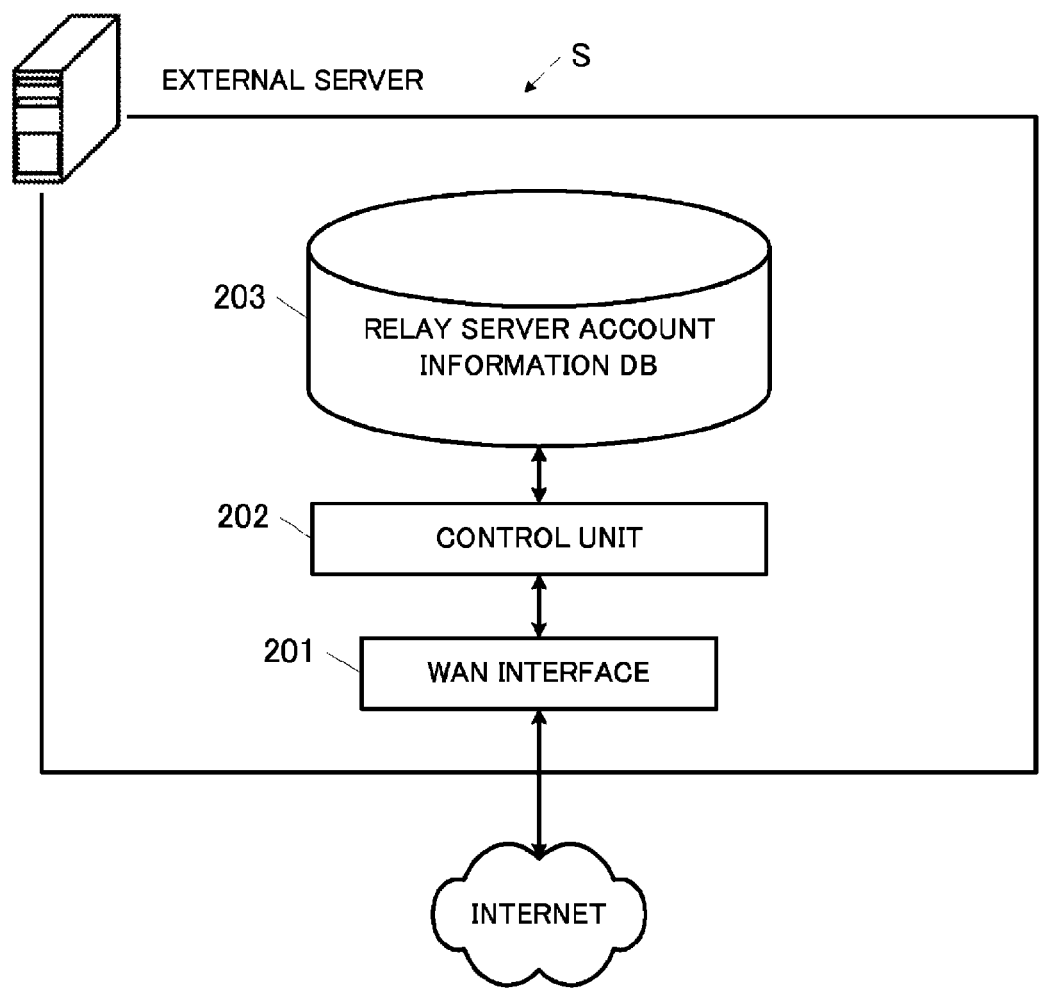
FIG. 2 is a functional block diagram of an external server.

The external server S will now be described with reference to FIG. 2. FIG. 2 is a functional block diagram of the external server S. The external server S is a device used for communication between the relay servers R provided in each LAN, and is preferably installed on the Internet.

The external server S shown in FIG. 2 has a function serving as a SIP (Session Initiation Protocol) server. Specifically, the external server S has a function serving as a SIP proxy server for relaying SIP methods and responses, and a SIP registrar server for registering the account of the relay server R.

As shown in FIG. 2, the external server S includes a WAN interface 201, a control unit 202, and a relay server account information database 203, as a main configuration.

The WAN interface 201 is an interface for communicating with each device such as a relay server R connected to the Internet using a global IP address.

The relay server account information database 203 is a database for managing the account of the relay server R that has made a registration request corresponding to the global IP address.

The control unit 202 is a processing unit arranged to control various communications performed through the WAN interface 201, and controls communication processes pursuant to protocols such as TCP/IP, UDP, and SIP. For instance, the control unit 202 executes processes such as the process of receiving the account of each relay server R from the relevant relay server R and registering the received account in the relay server account information database 203, and the process of relaying communication data such as various SIP methods and responses transmitted from the relay server R to another relay server R. The details of each function of the external server S, centering on the control unit 202, will be hereinafter described.

Figure 3:
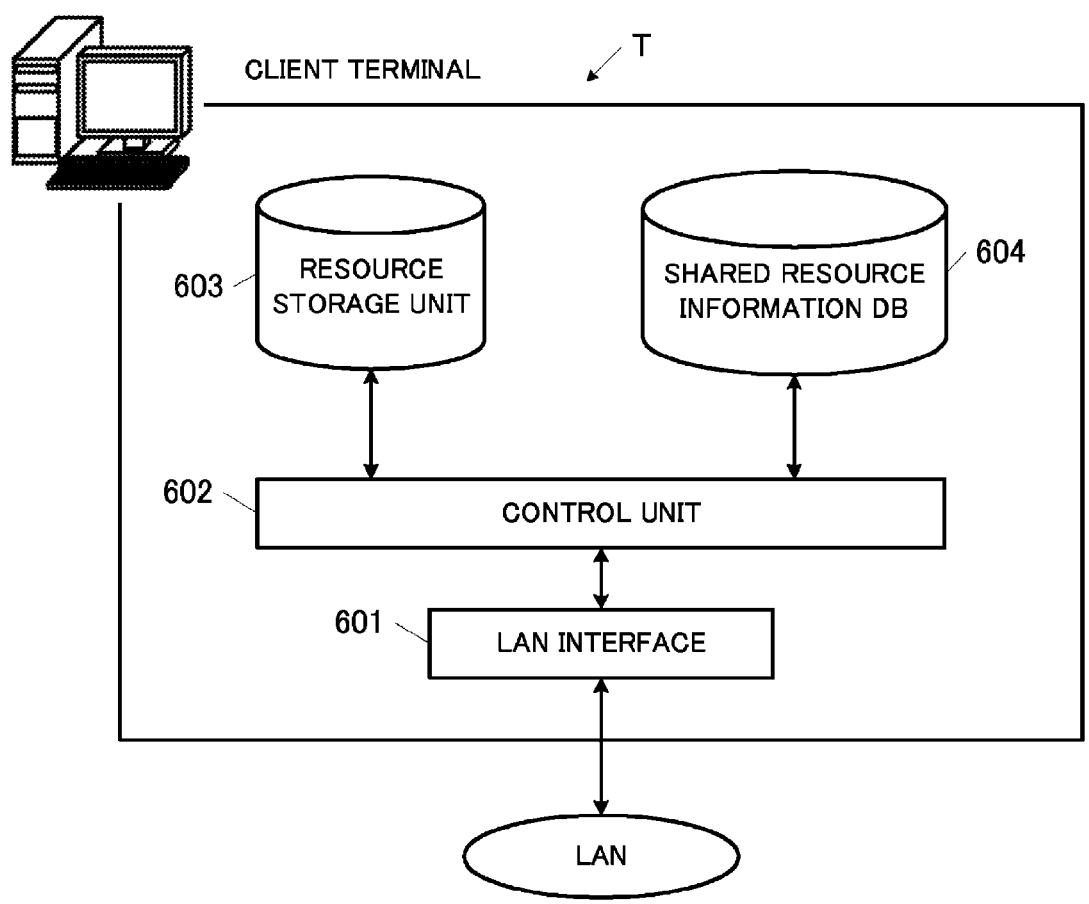
FIG. 3 is a functional block diagram of a client terminal.

The client terminal T will be described with reference to FIG. 3. FIG. 3 is a functional block diagram of the client terminal T.

The client terminal T is a terminal that can be directly operated by the user, and includes, e.g., a personal computer (PC) and the like used by the user in a daily routine. A great number of client terminals T normally exist in the LAN, but in the present preferred embodiment, as shown in FIG. 1, there will be described a case where the client terminals 1A, 1B are connected to the LAN 1, the client terminals 2A, 2B are connected to the LAN 2, the client terminals 3A, 3B are connected to the LAN 3, and the client terminals 4A, 4B are connected to the LAN 4 by way of example. A private IP address uniquely managed in the same LAN is given to each client terminal T.

As shown in FIG. 3, the client terminal T includes a LAN interface 601, a control unit 602, a resource storage unit 603, and a shared resource information database 604, as a main configuration.

The LAN interface 601 is an interface for communicating with each device such as relay server R and file server F connected to the same LAN using the private IP address.

The resource storage unit 603 stores entities of resources such as files and folders operable by the client terminal T.

The shared resource information database 604 stores shared resource information described with information of a shared resource held by each client terminal T.

The control unit 602 is a processing unit arranged to control various communications performed through the LAN interface 601. The control unit 602 controls communication processes pursuant to protocols such as TCP/IP, UDP, and SIP.

For instance, the control unit 602 executes the process of controlling movement, change, deletion, etc., of resources stored in the resource storage unit 603. The control unit 602 also performs the process of updating the shared resource information stored in the shared resource information database 604 when receiving change notification of the shared resource information from the relay server R. The details of the functions of each client terminal T, centering on the control unit 602, will be hereinafter described.

Figure 4:
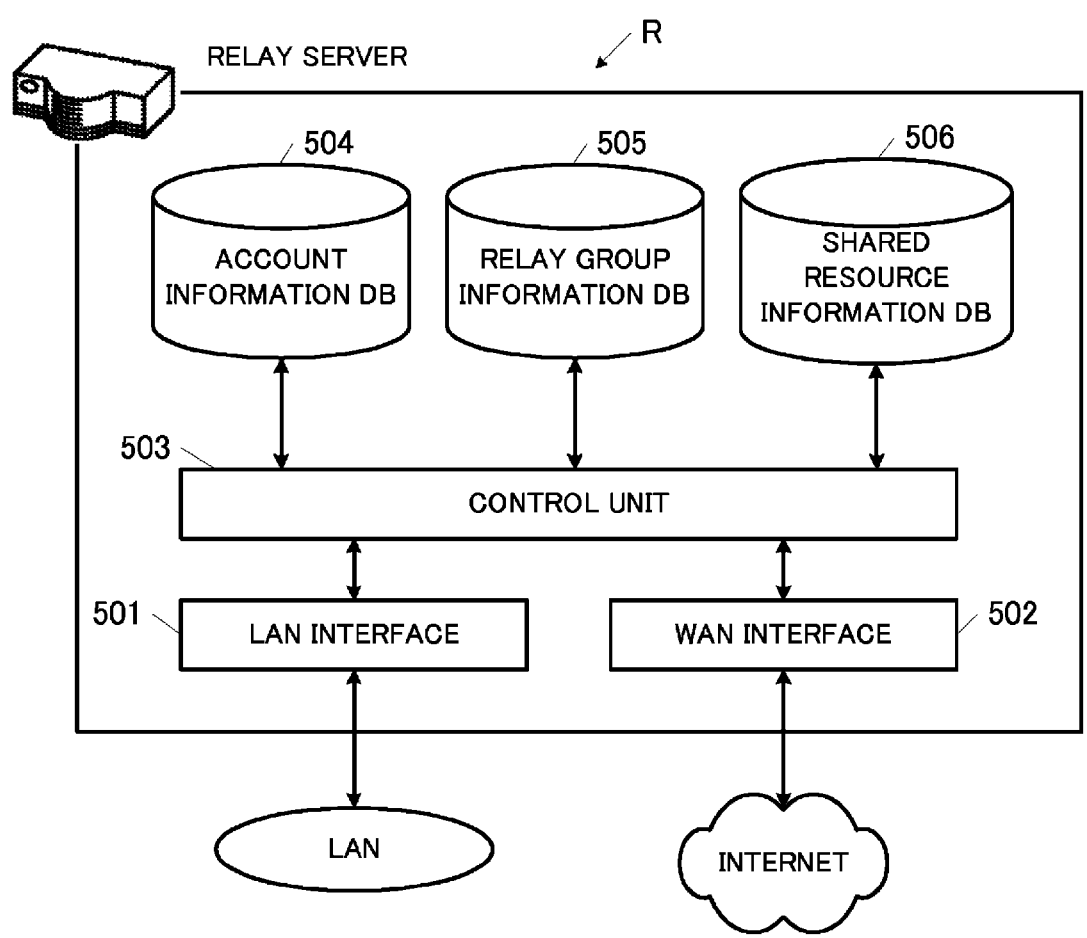
FIG. 4 is a functional block diagram of a relay server.

The relay server R will now be described with reference to FIG. 4. FIG. 4 is a functional block diagram of each relay server R.

As shown in FIG. 1, one relay server R is arranged in each LAN. Specifically, the relay server R1 is arranged in the LAN 1, the relay server R2 is arranged in the LAN 2, the relay server R3 is arranged in the LAN 3, and the relay server R4 is arranged in the LAN 4.

The relay server R is connected to the LAN, and is able to communicate with each client terminal T connected to the same LAN. The relay server R is also connected to the Internet, and is able to communicate with the relay server R connected to another LAN through the external server S. For such communication, both the private IP address and the global IP address are provided to each relay server R.

As shown in FIG. 4, the relay server R includes a LAN interface 501, a WAN interface 502, a control unit 503, an account information database 504, a relay group information database 505, and a shared resource information database 506, as a main configuration.

The LAN interface 501 is an interface for communicating with the client terminal T connected to the same LAN as its own device using the private IP address. For instance, the relay server R1 can communicate with each client terminal 1A, 1B using the LAN interface 501 in the LAN 1.

The WAN interface 502 is an interface for communicating with each device such as external server S connected to the Internet using the global IP address.

Each relay server R has a function serving as the SIP registrar server, where the communication between each relay server R and each client terminal T is performed using the SIP. For instance, the relay server R2 serves as the SIP registrar server in the LAN 2, receives the account of each client terminal 2A, 2B connected to the LAN 2, and registers the account in the account information database 504.

Figure 5:
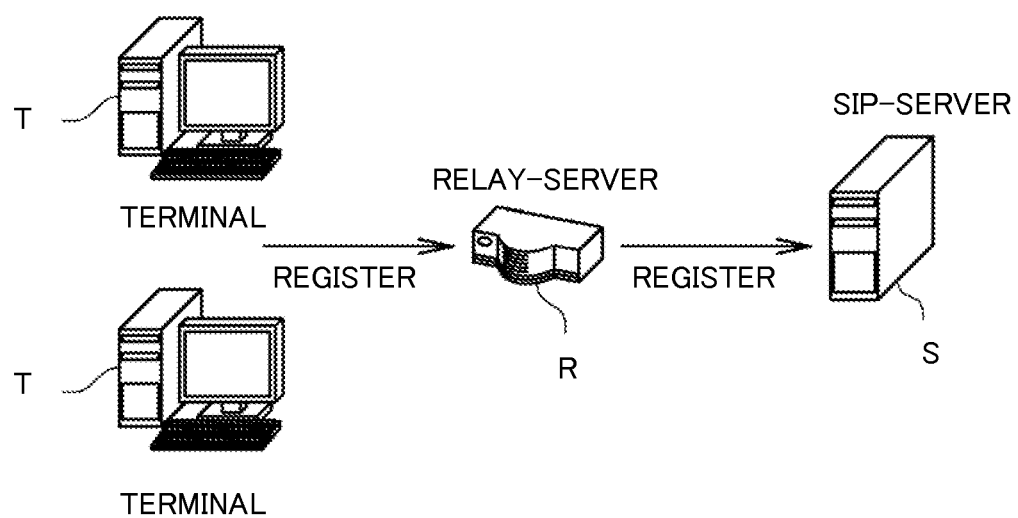
FIG. 5 is a view showing the relationship of the client terminal, the relay server, and the external server.

Therefore, as shown in FIG. 5, in the relationship with the client terminal T, the relay server R serves as a server for receiving the account from the relevant client terminal T and registering the received account. In the relationship with the external server S, the relay server R serves as a client for transmitting the account to the external server S and registering the transmitted account.

The account information database 504 in FIG. 4 is a database for managing the account of the client terminal T that has made a registration request corresponding to the private IP address.

The relay group information database 505 is a database for managing the relay group information to which the client terminal T registered in the account information database 504 relates.

The shared resource information database 506 is a database for managing the shared resource information to which the client terminal T registered in the account information database 504 relates.

The control unit 503 is a processing unit arranged to control various communications performed via the LAN interface 501 and the WAN interface 502, and controls various communication processes pursuant to protocols such as TCP/IP, UDP, and SIP.

For instance, the control unit 503 executes the process of transmitting the account of its own device to the external server S and requesting registration, the process of creating the relay group information and storing the same in the relay group information database 505, the process of creating the shared resource information and storing the same in the shared resource information database 506, and the like. The details of each function of the relay server R, centering on the control unit 503 and the like, will be hereinafter described.

The file server F will now be described. As shown in FIG. 1, the file server F is connected to the LAN, and is able to communicate with each client terminal T connected to the same LAN.

The file server F is configured to store the entities of resources such as files and folders, and serves as a resource storage alternative to the resource storage unit 603 (FIG. 3) arranged in each client terminal T. That is, in the present preferred embodiment, the resource that can be operated by each client terminal T includes a case of being stored on a local disc of the relevant client terminal T and a case of being stored in the file server F serving as a network drive. The file server F is not essential in each LAN, and the installation thereof is omitted in the LANs 2 and 4 in the example of FIG. 1.

The relay group information and the shared resource information, which are information handled in the present relay communication system, will now be described.

First, the relay group information will be described with reference to FIGS. 6 and 7. FIG. 6 is a view showing a content example of the relay group information.

A stored content example of the relay group information database 505 in the relay server R1 is shown in FIG. 6. In this example, the relay group information database 505 stores two relay group information 100a and 100b.

Each relay group information 100a, 100b includes one group identifying information 101, and information (relay account information) 102 of the relay server R configuring the relay group by permitting connection with one another.

The group identifying information 101 is information for identifying the relay group information 100, and is provided with a different ID so as to be uniquely identified every time the relay group information 100 is created. Therefore, the operator and the like can identify the relay group based on the group identifying information 101 and easily change, etc., the group configuration.

The relay account information 102 includes information of the account of the respective relay server R configuring the relay group by permitting connection with one another. For instance, in the relay group information 100a shown on the upper side of FIG. 6, there are described the accounts of three servers R1, R2, and R3 defining the relay group. In the relay group information 100b shown on the lower side of FIG. 6, there are described the accounts of two relay servers R1 and R3 defining the relay group.

In the relay account information 102, a specific name provided to the account of each relay server R is also registered so as to be easily identified by the user. For instance, in the relay account information 102a of the relay server R1 (relay-server 1), the name (branch office A) is provided to the account (relay-server1@net) of the relay server R1.

Therefore, the relay group information 100a and 100b are created to be uniquely identifiable for every relay group. The relay group information 100a, 100b include the account (relay account information 102) of each relay server defining a group (relay group) by permitting connection with one another. Therefore, with which LANs the group is configured becomes apparent by referencing the relay group information 100a, 100b.

The resource sharable terminal information 110 that can be included in the relay group information 100 will now be described. FIG. 7 shows a state in which the resource sharable terminal information is added to the relay group information of FIG. 6.

As shown in FIG. 7, the resource sharable terminal information 110 is registered in correspondence to each relay group information 100. For instance, the resource sharable terminal information 110a is registered in correspondence to the relay group information 100a, and the resource sharable terminal information 110b is registered in correspondence to the relay group information 100b.

Each resource sharable terminal information 110a, 110b includes individual terminal information 111 described with the client terminal T given permission to share the resource in the relay group related to the corresponding relay group information 100a, 100b. The individual terminal information 111 is information described with the account of each client terminal T capable of sharing the resource.

For instance, the relay group information 100a corresponding to the resource sharable terminal information 110a on the upper side of FIG. 7 defines the relay group configured by three relay servers R1, R2, and R3. As shown in FIG. 1, two client terminals 1A, 1B exist in the LAN 1 to which the relay server R1 is connected. In the example of the resource sharable terminal information 110a on the upper side of FIG. 7, only the client terminal 1A of the two client terminals is selected as a terminal capable of sharing the resource in the relay group, and the account information thereof is registered as the individual terminal information 111. Similarly, only the client terminal 2A is selected as a resource sharable terminal in the LAN 2 to which the relay server R2 is connected, only the client terminal 3A is selected as a resource sharable terminal in the LAN 3 to which the relay server R3 is connected, and the respective account information are registered as the individual terminal information 111.

The relay group information 100b corresponding to the resource sharable terminal information 110b on the lower side of FIG. 7 defines the relay group defined by two relay servers R1 and R3. In the example of the resource sharable terminal information 110b, only the client terminal 1A is selected as a resource sharable terminal in the LAN 1 to which the relay server R1 is connected, and the account information thereof is registered as the individual terminal information 111. Moreover, two client terminals 3A, 3B are selected as resource sharable terminals in the LAN 3 to which the relay server R3 is connected, and the account information thereof are registered as the individual terminal information 111.

In the individual terminal information 111, a specific name given to the account is registered in addition to the account of each resource sharable terminal T, so as to be easily identified by the user. In a case of the client terminal (terminal 1A), the name (terminal 1A) given to the account (e.g., user1A@relay-server1.net) is described. Furthermore, department identifying data indicating the department of the resource sharable terminal T such as sales and marketing department, development department, and the like is described in the individual terminal information 111.

In the resource sharable terminal information 110, each individual terminal information 111 is described in association with the relay account information 102 of the relay server connected to the same LAN as the resource sharable terminal T. In a case of the client terminal 1A, the individual terminal information 111 is described in association with the relay account information 102a of the relay server R1.

As shown in the example of FIG. 7, the relay group information database 505 of the relay server R is able to store plural relay group information 100 and resource sharable terminal information 110. The client terminal 1A is the resource sharable terminal in both resource sharable terminal information 110a, 110b in the two relay groups, and the individual terminal information 111 thereof is described. Thus, one client terminal T is selected as the resource sharable terminal from a plurality of relay groups, and the resource sharable terminal information 110 indicating the above state is stored in the relay group information database 505.

Each relay group information 100 is exchanged between each relay server R defining the relay group. For instance, the relay group information 100a on the upper side of FIG. 6 (FIG. 7) is exchanged among the three relay servers R1, R2, and R3, and is stored in the relay group information database 505 of each relay server R1, R2, and R3. The relay group information 100b on the lower side of FIG. 6 (FIG. 7) is exchanged between the two relay servers R1 and R3, and is stored in the relay group information database 505 of each relay server R1 and R3.

The content of the shared resource information will now be described with reference to FIG. 8. FIG. 8 shows the shared resource information 120 stored in the shared resource information database 604 of the client terminal 1A, as an example. The same information is also stored in the shared resource information database 506 of the relay server R1 connected to the same LAN as the client terminal 1A.

The shared resource information 120 is configured by account identifying information 121 indicating the to be shared resource information related to the client terminal 1A, and individual shared resource information 122 to which the client terminal 1A relates.

The shared resource information 120 is created for every client terminal T, and the account identifying information 121 is information for identifying the shared resource information.

The individual shared resource information 122 is defined by shared resource identifying information 123, family account information 124, family resource information 125, and the like.

The shared resource identifying information 123 is information for identifying the individual shared resource information 122, and is given a different ID so as to be capable of being uniquely identified every time the individual shared resource information 122 is created. The shared resource identifying information 123 here is configured by an ID (e.g., 20061001150032user1A@relay-server1.net) associated with the client terminal T that has made a request to create the shared resource information 120, and a name (user1A-policy01) for facilitating the identification thereof.

Thus, the user and the like can identify the individual shared resource information 122 based on the shared resource identifying information 123 and easily edit, etc. the content thereof.

The family resource information 125 is an aggregate of resource information 126 indicating entities of resources such as files and folders held by the client terminal T. Each resource information 126 is configured by information (e.g., name="folderA") of the name of the entity of the resource to be shared, account information (e.g., owner="user1A@relay-server1.net") of the client terminal T (owner client terminal) capable of operating the entity of the relevant resource, and information (e.g., value="c:/folderA") of the address indicating a location of the entity of the resource.

The family account information 124 is an aggregate of information of the account (e.g., user1A@relay-server1.net) of the client terminal T sharing the entity of the resource indicated in the family resource information 125. The family account information 124 is configured by information on the owner client terminal T, and information on the client terminal T (user client terminal) capable of operating the entity of the resource indirectly through the owner client terminal. The user client terminal T is a client terminal that cannot directly operate the entity of the resource, but can indirectly operate the resource through the owner client terminal T.

In the example of the individual shared resource information 122 in FIG. 8, the owner client terminal is 1A and the user client terminal is 2A and 3A. Each of the owner client terminal 1A and the user client terminals 2A, 3A is connected to the same LAN as one of the three relay servers R1, R2, and R3 defining the relay group described in the relay group information 100a in FIG. 6. Furthermore, the owner client terminal 1A and the user client terminals 2A, 3A are all client terminals having the individual terminal information 111 described as being the resource sharable terminal in the resource sharable terminal information (110a in FIG. 7) in the relay group.

Figure 9:
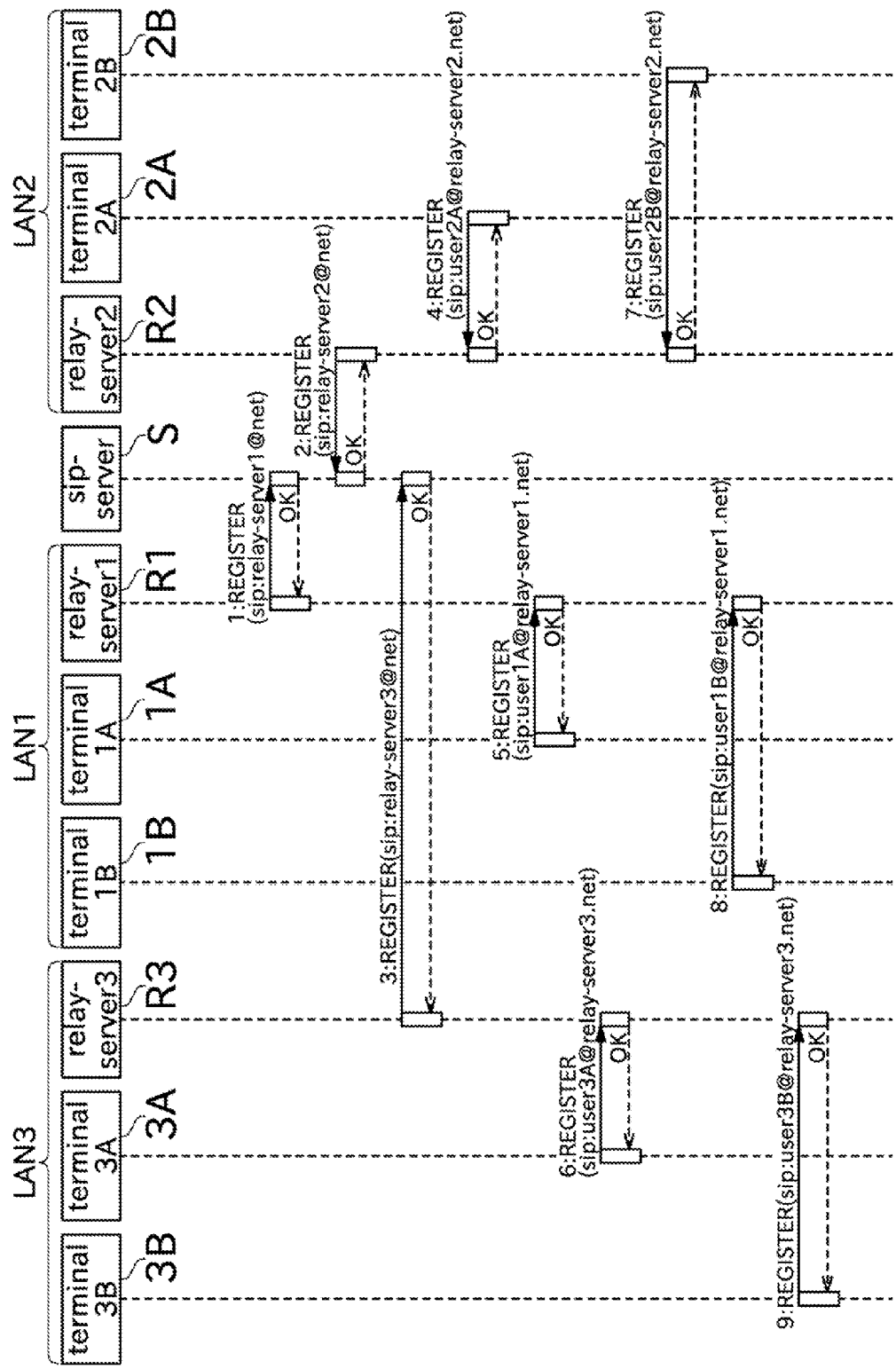
FIG. 9 is a sequence chart showing a communication process of registering the relay server and the client terminal.

The process flow of communication in the relay communication system configured as above will be described below using a sequence chart shown in FIG. 9. The sequence numbers 1 to 9 shown in FIG. 9 indicate the registration stage of the account of each device.

In sequence number 1, the relay server R1 transmits a registration request (REGISTER) of the account to the external server S. Here, the relay server R1 makes a request for registration of the account (sip: relay-server1@net) of its own device. The external server S returns an OK response to the relay server R1, and registers the account of the relay server R1 and the global IP address of the relay server R1 in the relay server account information database 203 in correspondence with each other.

Similarly, the relay servers R2 and R3 make a registration request (REGISTER) of the account of its own devices to the external server S to register the account, etc., of its own device in the external server S (sequence numbers 2, 3).

In sequence number 4, the client terminal 2A transmits a registration request (REGISTER) of the account to the relay server 2. Here, the client terminal 2A makes a request for registration of the account (sip: user2A@relay-server2.net) of its own device. The relay server R2 returns an OK response, and registers the account and the private address of the client terminal 2A in the account information database 504 in correspondence with each other.

Similarly, the client terminals 1A, 3A, 2B, 1B, and 3B make a request for registration of the account of its own devices to each relay server R to register the account, etc. of its own device in the relay server R (sequence numbers 5 to 9).

The registration of the account of each relay server R in the external server S and registration of the account of each client terminal T in the relay server R are completed through the above-described processes. The sequence described above is an example, and the order may be arbitrary set as long as the registration of the account of each device is completed as a result.

Even the relay server R and the client terminal T existing on the network cannot participate in the relay communication system of the present preferred embodiment unless the account thereof is registered. For instance, the relay server R4 and the client terminals 4A, 4B in FIG. 1 cannot participate in the communication described below since the account registration thereof is not performed in the process of FIG. 9.

Figure 10:
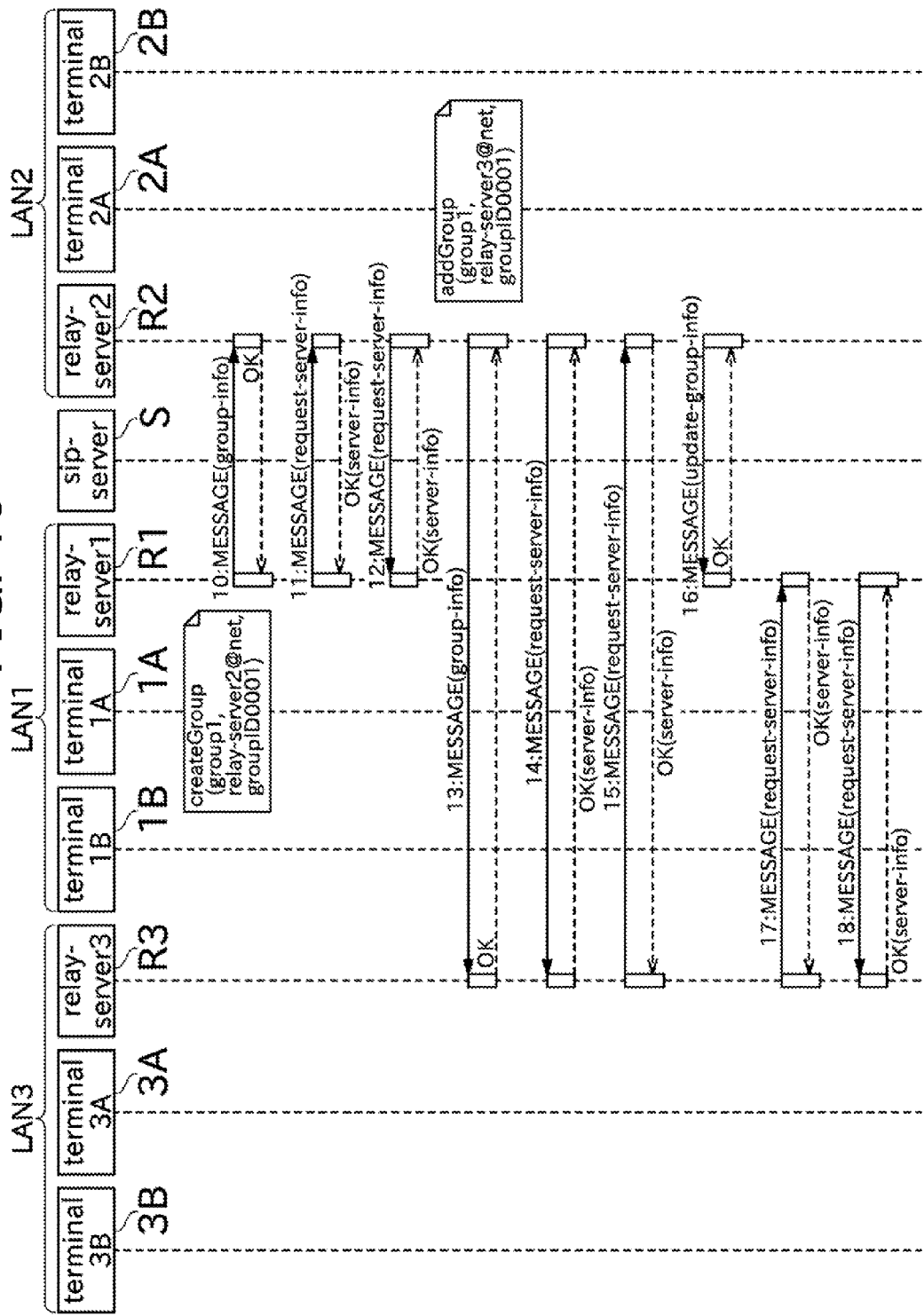
FIG. 10 is a sequence chart showing a communication process of creating a relay group with three relay servers.

The generation and registration stages of the relay group will now be described with reference to sequence numbers 10 to 18 in FIG. 10. The processes of sequence numbers 1 to 18 shown in FIGS. 9 and 10 are generally carried out as an initial setting of the network by the user or the operator.

First, in the relay server R1, a METHOD (createGroup METHOD) for newly forming a relay group with the relay server R2 is executed by the operator. In such createGroup METHOD, there are specified the group name (group1), the account (relay-server2@net) of the relay server 2 of the opponent configuring the relay group, and the identification ID (groupID0001) given to the newly created relay group.

A message transmission command (MESSAGE METHOD) is then executed in the relay server R1, and a group-info message with respect to the relay server R2 serving as the opponent is transmitted to the external server S (sequence number 10). This message contains the group name, the identification ID of the relay group, and the like specified in the createGroup METHOD.

In this MESSAGE METHOD, the account (sip: relay-server2@net) of the relay server R2 of the message destination is specified. The external server S acquires the global IP address of the relay server R2 by referencing the relay server account information database 203, and relays the group-info message from the relay server R1 to the relay server R2. The relay server R2 that has received the message returns an OK response to the relay server R1 through the external server S.

The communication between each relay server R of the present preferred embodiment is thus performed through the external server S, and is the same in the following description. Therefore, specific description of the communication process through the external server S will be omitted in the following description.

The relay server R1 then transmits a transmission request message (request-server-info message) of the server information to the relay server R2 (sequence number 11). The relay server R2 that has received the message returns the information (server-info) related to its own device to the relay server R1 along with an OK response.

On the other hand, the relay server R2 transmits a request-server-info message to the relay server R1 (sequence 12), and the relay server R1 returns the information (server-info) related to its own device to the relay server R2.

Through the exchange of information related to the respective server carried out in the above manner, the relay group information 100 indicating that the relay servers R1, R2 have formed the relay group is generated, and is stored in the relay group information database 505 of each relay server R1, R2.

Next, in the relay server R2, a method (addGroup METHOD) of newly adding the relay server R3 to the previously created relay group (relay group configured by relay servers R1, R2) is executed by the operator. In the addGroup METHOD, the group name (group1) of the relay group to be added to, the account (relay-server3@net) of the relay server R3 to be added, and the identification ID (groupID0001) of the relay group to be added to are specified.

Then, the relay server R2 transmits a group-info message to the relay server R3 serving as the opponent to be added (sequence number 13). This message contains the group name, the identification ID of the relay group, and the like specified in the addGroup METHOD. The relay server R3 that has received the message returns an OK response to the relay server R2. The server information is exchanged between the relay server R2 and the relay server R3 (sequence numbers 14, 15) in a manner exactly similar to the above-described sequence numbers 11 and 12.

The relay server R2 transmits an update-group-info message notifying that the relay server R3 has been added to the relay group to the relay server R1 (sequence number 16). The relay server R1 that has received the message returns an OK response to the relay server R2. Thereafter, the server information is exchanged between the relay server R3 and the relay server R1 (sequence numbers 17, 18).

The relay group information 100 (specifically, information of the content indicated by reference numeral 100a in FIG. 6) indicating that the three relay servers R1, R2, and R3 define a relay group is stored in the relay group information database 505 of each relay server R1, R2, and R3.

Although not illustrated in FIG. 10, the createGroup METHOD is further executed in the relay server R1, and a relay group is newly formed between the relay server R1 and the relay server R3. The communication in this case is exactly the same as that described in the sequence numbers 10 to 12, and thus the description thereof will be omitted. The relay group information 100 (specifically, information of the content indicated by reference numeral 100b in FIG. 6) indicating that the relay servers R1 and R3 define a relay group is stored in the relay group information database 505 of each relay server R1 and R3.

The registration stage of the resource sharable terminal with respect to the relay group will be described with reference to sequence numbers 21 to 29 in FIG. 11.

In the relay server R1, a METHOD (addTerminal METHOD) of registering the client terminal 1A as the resource sharable terminal in the relay group defined by the three relay servers R1, R2, and R3 is executed by the operator. The account of the client terminal 1A and the identification ID (groupID0001) indicating the relay group of the registration destination are specified in addTerminal METHOD.

When the addTerminal METHOD is executed, the relay server R1 searches the relay group information database 505 of its own device, and adds the individual terminal information 111 of the client terminal 1A to the resource sharable terminal information 110 corresponding to the relay group information of the specified identification ID.

Immediately thereafter, the relay server R1 specifies the relay group information 100 with the identification ID from the stored content of the relay group information database 505, and checks with which relay server R the relevant relay group is being configured. The target relay group is found to be configured by its own device (relay server R1) and two relay servers R2 and R3 from the relay group information 100a in FIG. 6 (FIG. 7).

Therefore, the relay server R1 first transmits to the relay server R2 an add-group-info message requesting addition of a resource sharable terminal to the relay group (sequence number 21). This message contains the account of the client terminal 1A that becomes the target, the identification ID of the relay group of the registration destination, and the like. The relay server R2 that has received this message adds the individual terminal information 111 of the client terminal 1A to the resource sharable terminal information 110 stored in the relay group information database 505, and returns an OK response.

Thereafter, the relay server R1 transmits a group-info message to the client terminal 1A (sequence number 22). This message contains the resource sharable terminal information 110 added to the individual terminal information 111 of the client terminal 1A. The client terminal 1A that has received the message stores the content of the received resource sharable terminal information 110 in an appropriate storage.

Subsequently, the relay server R1 also transmits to the relay server R3 an add-group-info message requesting addition of the resource sharable terminal to the relay group (sequence number 23). The relay server R3 that has received this message adds the individual terminal information 111 of the client terminal 1A to the resource sharable terminal information 110 stored in the relay group information database 505, and returns an OK response.

Therefore, the individual terminal information 111 of the client terminal 1A is registered as the resource sharable terminal in the resource sharable terminal information 110 of the relay group information 100 stored in the relay group information databases 505 of the three relay servers R1, R2, and R3.

In the relay server R2, a METHOD (addTerminal METHOD) of specifying the identification ID of the relay group and registering the client terminal 2A as the resource sharable terminal is executed by the operator.

The relay server R2 searches the relay group information database 505 of its own device, and adds the individual terminal information 111 of the client terminal 2A to the resource sharable terminal information 110 corresponding to the relay group information specified by the identification ID.

The relay server R2 transmits to the relay server R1 an add-group-info message requesting addition of the resource sharable terminal to the relay group (sequence number 24). This message contains the account of the client terminal 2A that becomes the target, the identification ID of the relay group of the registration destination, and the like.

The relay server R1 that has received this message adds the individual terminal information 111 of the client terminal 2A to the resource sharable terminal information 110 stored in the relay group information database 505. The relay server R1 also transmits an add-group-info message to the client terminal 1A connected to the same LAN as its own device and already registered as the resource sharable terminal (sequence number 24.1). The client terminal 1A that has received this message stores the individual terminal information 111 of the client terminal 2A in an appropriate storage. Thereafter, the client terminal 1A returns an OK response to the relay server R1, and the relay server R1 that has received the response returns an OK response to the relay server R2.

The relay server R2 then transmits a group-info message to the client terminal 2A (sequence number 25). This message contains the resource sharable terminal information 110 added to the individual terminal information 111 of the client terminals 1A and 2A. The client terminal 2A that has received the message stores the content of the received resource sharable terminal information 110 in an appropriate storage.

Subsequently, the relay server R2 also transmits to the relay server R3 an add-group-info message requesting addition of the resource sharable terminal to the relay group (sequence number 26). The relay server R3 that has received this message adds the individual terminal information 111 of the client terminal 2A to the resource sharable terminal information 110 stored in the relay group information database 505, and returns an OK response.

Therefore, the individual terminal information 111 of the client terminals 1A and 2A are registered as the resource sharable terminal in the resource sharable terminal information 110 of the relay group information 100 stored in the relay group information databases 505 of the three relay servers R1, R2, and R3.

In the relay server R3, a METHOD (addTerminal METHOD) of specifying the identification ID of the relay group and registering the client terminal 3A as the resource sharable terminal is executed by the operator.

The relay server R3 then searches the relay group information database 505 of its own device, and adds the individual terminal information 111 of the client terminal 3A to the resource sharable terminal information 110 related to the relay group information specified by the identification ID.

The relay server R3 transmits to the relay server R1 an add-group-info message requesting addition of the resource sharable terminal to the relay group (sequence number 27). This message contains the account of the client terminal 3A that becomes the target, the identification ID of the relay group of the registration destination, and the like.

The relay server R1 that has received this message adds the individual terminal information 111 of the client terminal 3A to the resource sharable terminal information 110 stored in the relay group information database 505. The relay server R1 transmits an add-group-info message to the client terminal 1A connected to the same LAN as its own device and already registered as the resource sharable terminal (sequence number 27.1). The client terminal 1A that has received this message stores the individual terminal information 111 of the client terminal 3A in an appropriate storage. Thereafter, the client terminal 1A returns an OK response to the relay server R1, and the relay server R1 that has received the response returns an OK response to the relay server R3.

The relay server R3 then transmits a group-info message to the client terminal 3A (sequence number 28). This message contains the resource sharable terminal information 110 added to the individual terminal information 111 of the client terminal 3A. The client terminal 3A that has received the message stores the content of the received resource sharable terminal information 110 in an appropriate storage.

Subsequently, the relay server R3 also transmits to the relay server R2 an add-group-info message requesting addition of the resource sharable terminal to the relay group (sequence number 29). The relay server R2 that has received this message adds the individual terminal information 111 of the client terminal 3A to the resource sharable terminal information 110 stored in the relay group information database 505. The relay server R2 furthermore transmits an add-group-info message to the client terminal 2A connected to the same LAN as its own device and already registered as the resource sharable terminal (sequence number 29.1). The client terminal 2A that has received this message stores the individual terminal information 111 of the client terminal 3A in an appropriate storage. Thereafter, the client terminal 2A returns an OK response to the relay server R2, and the relay server R2 that has received the response returns an OK response to the relay server R3.

Therefore, the individual terminal information 111 of the client terminals 1A, 2A, and 3A are registered as the resource sharable terminal in the resource sharable terminal information 110 of the relay group information 100 stored in the relay group information databases 505 of the three relay servers R1, R2, and R3 (see reference numeral 110a in FIG. 7).

Although not illustrated, in the relay server R1, the addTerminal METHOD of specifying the identification ID of the relay group consisting of two relay servers R1 and R3, and adding the client terminal 1A as the resource sharable terminal is executed. In the relay server R3, the addTerminal METHOD of specifying the identification ID of the relay group the same as above, and adding two client terminals 3A, 3B as the resource sharable terminal is executed. Accordingly, the client terminals 1A, 3A, and 3B are registered as the resource sharable terminal in the relay group defined by two relay servers R1, R3. Through such a process, the resource sharable terminal information indicated by reference numeral 110b in FIG. 7 is stored in the relay group information databases 505 of the relay servers R1, R3.

Figure 11:
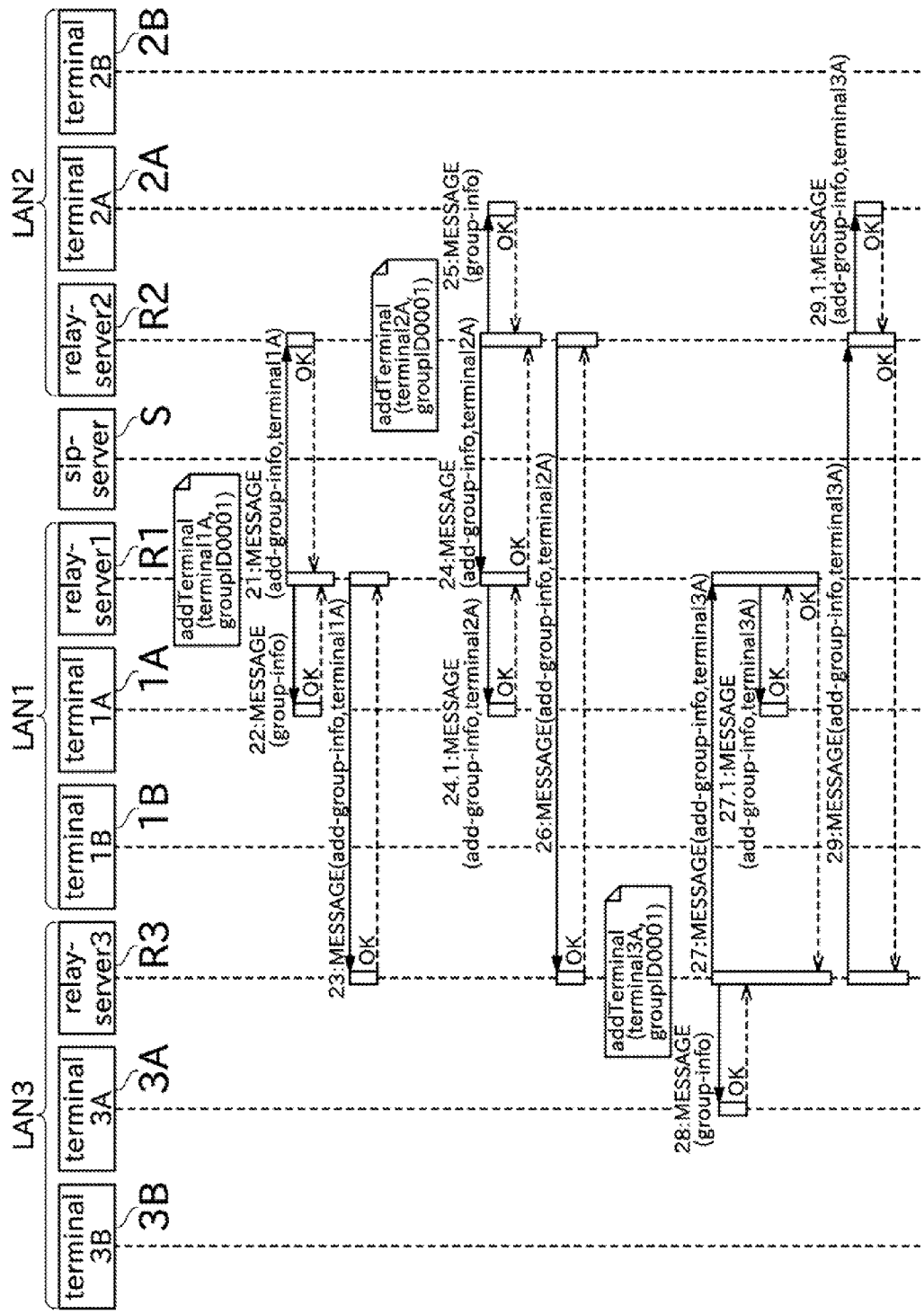
FIG. 11 is a sequence chart showing a communication process of registering the client terminal to the relay group as a resource sharable terminal.

In FIG. 11, a process of registering the client terminal as the resource sharable terminal has been described, but the relay server R can also perform a process (deleteTerminal METHOD) of canceling the registration of the client terminal T as the resource sharable terminal. In this case, the individual terminal information 111 of the specified client terminal T is deleted from the resource sharable terminal information 110.

As described above, the addTerminal METHOD and the deleteTerminal METHOD merely need to be executed in the relay server R of the same LAN as the target client terminal T in order to register/cancel the resource sharable terminal, and the relay servers R of other LANs do not need to be operated. Therefore, the load on the operator is significantly reduced since a plurality of physically remote relay servers R do not need to be operated.

An operation of actually sharing the resource of the client terminal T will be described with reference to FIG. 12. Here, there will be described a case of sharing the folder "folderA" and the files "file001.xls", "file002.doc", "file003.pdf" held by the client terminal 1A with the client terminals 2A and 3A in the relay group of groupID0001.

The user operates the client terminal 1A, specifies the relay group of groupID0001, and thereafter gives an instruction to display the resource sharable terminal in the relay group to the client terminal 1A. The client terminal 1A acquires the information of the resource sharable terminal through communication with the relay server R1, and displays a list of resource sharable terminals in the specified relay group on the screen.

Since the relay group of groupID0001 is specified, two client terminals 2A and 3A are displayed as resource sharable terminals based on the resource sharable terminal information 110a shown on the upper side of FIG. 7. The user specifies the two displayed client terminals 2A, 3A as a terminal (user client terminal) for actually sharing the resource. In the present preferred embodiment, the two terminals are both specified as terminals for sharing the resource, but only one of the terminals may be specified.

Figure 12:
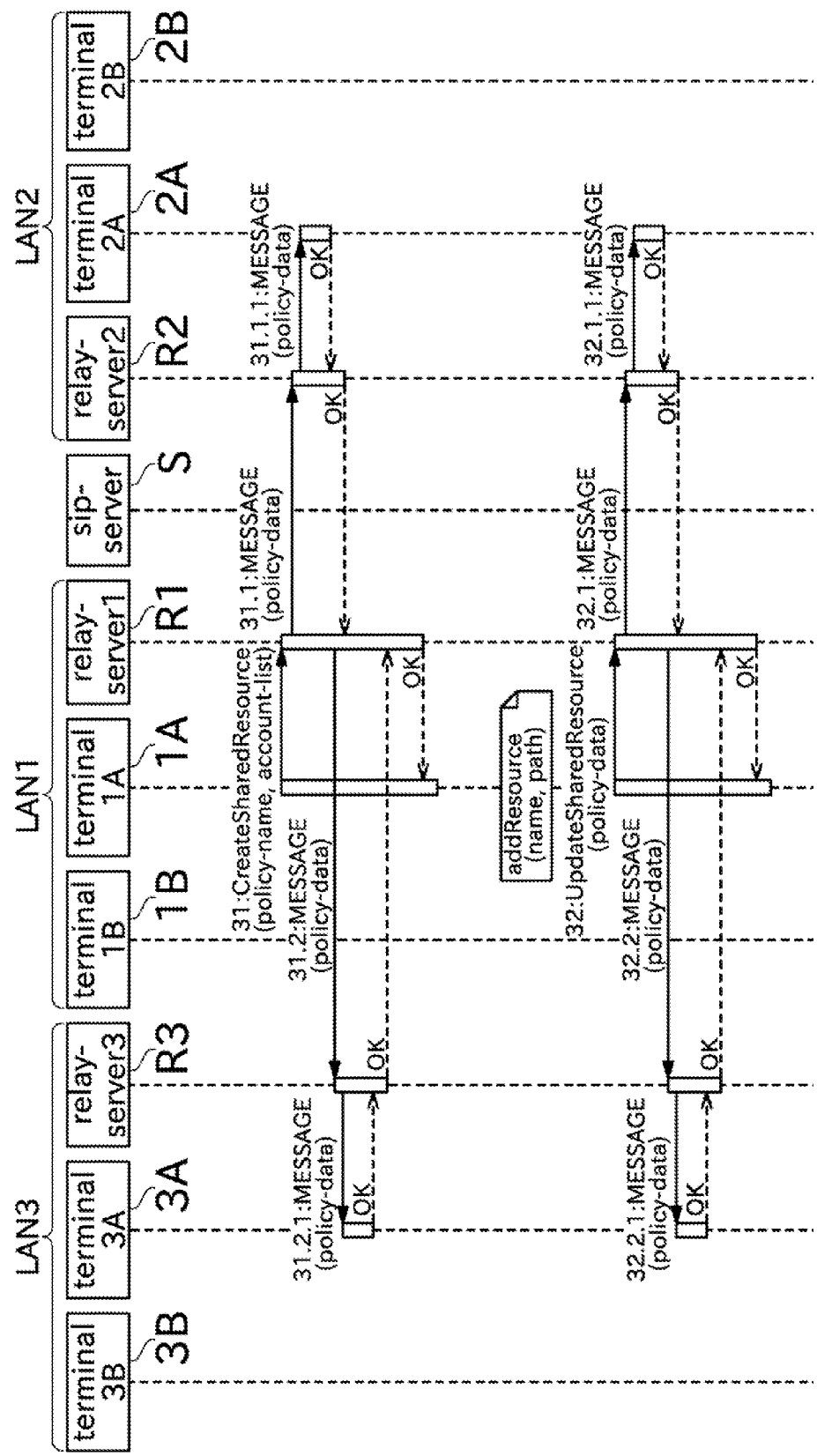
FIG. 12 is a sequence chart showing a communication process of registering the shared resource to the relay group.

The client terminal 1A then transmits a request to create the shared resource (CreateSharedResource command) to the relay server R1 (sequence number 31 in FIG. 12). This message contains the identification ID of the relay group and the information of the specified user client terminals 2A, 3A.

The relay server R1 that has received the message creates the shared resource information 120 and stores the same in the shared resource information database 506 of its own device. The relay server R1 references the content of the relay group information database 505 based on the identification ID of the relay group, transmits a policy-data message to the other relay servers R2, R3 defining the relay group, and notifies the created shared resource information 120 (sequence numbers 31.1, 31.2).

Each relay server R2, R3 that has received the message stores the shared resource information 120 in the shared resource information database 506 of its own device, transmits the policy-data message to each specified user client terminal 2A, 3A and notifies the shared resource information 120 (sequence numbers 31.1.1, 31.2.1). Each user client terminal 2A, 3A that has received the message changes the shared resource information 120 stored in the shared resource information database 604 of its own device, and returns an OK response to the relay servers R2, R3 of the transmission source. The relay servers R2, R3 that have received the OK response return an OK response to the relay server R1, and the relay server R1 that has received the OK response returns an OK response to the client terminal 1A.

Therefore, the shared resource identifying information 123 and the family account information 124 are described in the shared resource information 120 stored in the shared resource information database 506 of the relay servers R1, R2, and R3. The same content is also described in the shared resource information 120 stored in the shared resource information database 604 of the client terminals 1A, 2A, and 3A.

When the user operates the client terminal 1A and executes the addResource METHOD, a process of adding the resource information (reference numeral 126 in FIG. 8) indicating the entities of the resource to be shared with the shared resource information 120 is performed. In the present preferred embodiment, the specification is made to select "folderA", "file001.xls", "file002.doc", and "file003.pdf" from the entities of the resources stored in the resource storage unit 603 of the client terminal 1A, and share them with the other client terminals 2A, 3A.

The client terminal 1A that has received the specification transmits a shared resource change request (UpdateSharedResource command) including the specified information to the relay server R1 (sequence number 32). The relay server R1 that has received the shared resource change request stores the changed shared resource information in the shared resource information database 506 of its own device. The relay server R1 transmits the policy-data message to each relay server R2, R3 connected with the user client terminal 2A, 3A, and notifies the changed shared resource information 120 (sequence numbers 32.1, 32.2).

Each relay server R2, R3 that has received the message stores the shared resource information 120 in the shared resource information database 506 of its own device, transmits the policy-data message to each specified user client terminal 2A, 3A, and notifies the shared resource information 120 (sequence numbers 32.1.1, 32.2.1). Each user client terminal 2A, 3A that has received the message changes the shared resource information 120 stored in the shared resource information database 604 of its own device, and returns an OK response to the relay servers R2, R3 of the transmission source. The relay servers R2, R3 that have received the OK response return an OK response to the relay server R1, and the relay server R1 that has received the OK response returns an OK response to the client terminal 1A.

Figure 13:
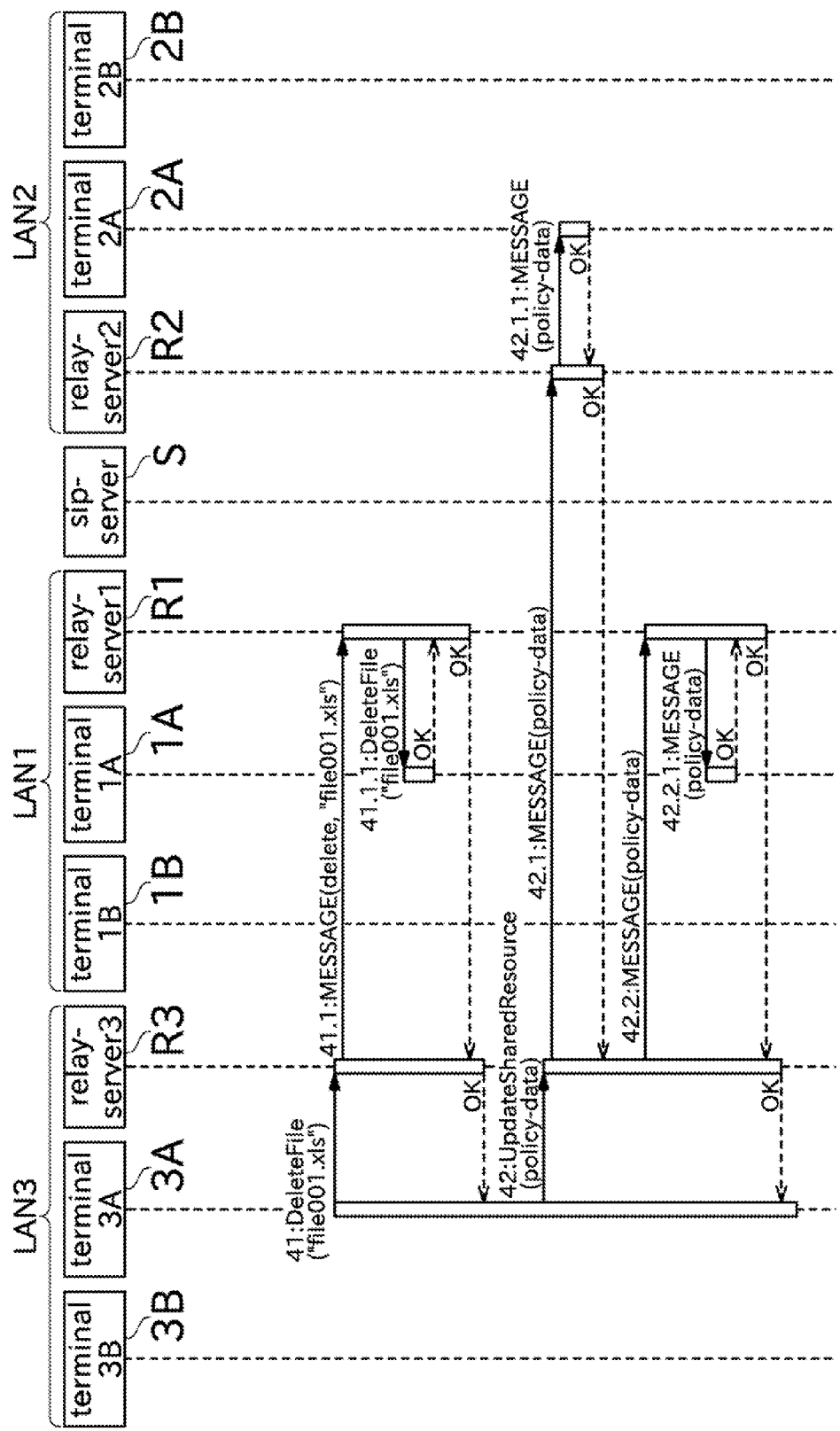
FIG. 13 is a sequence chart showing a communication process in a case where the resource sharable terminal indirectly deletes the shared resource held by the resource sharable terminal of another LAN.

With reference to FIG. 13, there will be described an operation of a case of operating the client terminal 3A and indirectly deleting the resource ("file001.xls") held by the client terminal 1A connected to the LAN1 different from the client terminal 3A.

Suppose the user of the client terminal 3A gives an instruction to delete "file001.xls" displayed as the shared resource. The client terminal 3A that has received the instruction transmits a file delete request (DeleteFile command) to the relay server R3 (sequence number 41 in FIG. 13).

When receiving the file delete request, the relay server R3 checks whether the client terminal 3A that has instructed the deletion is the resource sharable terminal and belongs to the relay group the same as the owner client terminal 1A having the file to be deleted (file001.xls). This determination is made based on the relay group information 100 and the resource sharable terminal information 110 stored in the relay group information database 505 of the relay server R3.

In this example, with reference to the relay group information 100a and the resource sharable terminal information 110a in FIG. 7, it is found that the user client terminal 3A and the owner client terminal 1A belong to the same relay group (groupID0001) and are selected as the resource sharable terminal in the relevant relay group. Therefore, the relay server R3 specifies that the relay server to which the client terminal 1A is connected is R1 based on the relay group information 100 stored in the relay group information database 505. The relay server R3 then transmits a delete message to the relay server R1, and relays the file delete instruction (sequence number 41.1).

In a case where a relay group in which both the user client terminal 3A and the owner client terminal 1A are registered as the sharable terminal does not exist when the stored content of the relay group information database 505 is checked, the relay server R3 does not relay the file delete instruction.

The relay server R1 that has received the delete message from the relay server R3 transmits a file delete request (DeleteFile command) to the client terminal 1A (sequence number 41.1.1). The client terminal 1A that has received the request deletes the target resource (file001.xls) from the resource storage unit 603, and returns an OK response to the relay server R1. The relay server R1 that has received the OK response returns an OK response to the relay server R3, and the relay server R3 that has received the OK response returns an OK response to the client terminal 3A.

An updating process of the shared resource information 120 is then performed. Specifically, the client terminal 3A that has instructed deletion of the file deletes the resource information 126 related to the deleted resource (file001.xls) from the family resource information 125 of the shared resource information 120 stored in the shared resource information database 604. The client terminal 3A then transmits a shared resource change request (UpdateSharedResource command) to the relay server R3 (sequence number 42). The relay server R3 that has received the change request then transmits the policy-data message to the relay servers R1, R2 related to the changed shared resource information 120, and notifies the changed shared resource information 120 (sequence number 42.1, 42.2).

Each relay server R1, R2 that has received the message stores the shared resource information 120 in the shared resource information database 506 of its own device, transmits the policy-data message to each user client terminal 1A, 2A related to the shared resource 120, and notifies the shared resource information 120 (sequence numbers 42.1.1, 42.2.1). Each user client terminal 1A, 2A that has received the message changes the shared resource information 120 stored in the shared resource information database 604 of its own device, and returns an OK response to the relay servers R1, R2 of the transmission source. The relay servers R1, R2 that have received the OK response returns an OK response to the relay server R3, and the relay server R3 that has received the OK response returns an OK response to the client terminal 3A.

As described above, when the shared resource information 120 is changed, such change is notified to the related relay server R and the client terminal R so as to be immediately updated to the new shared resource information 120.

An example of the operation for deleting the file (resource) has been described in FIG. 13, but the relaying operation of the relay server R3 is substantially the same even if the operation for updating the file held by the client terminal 1A to the file of different content is performed in the client terminal 3A.

As described above, when receiving the operation instruction (e.g., instruction to delete file "file001.xls" described in FIG. 13) of the resource from the client terminal 3A stored in the account information database 504, the relay server R3 connected to the LAN 3 in the present preferred embodiment operates in the following manner. That is, the relay server R3 references the resource sharable terminal information 110, and checks (1) whether or not the client terminal 3A is a resource sharable terminal, or (2) whether or not the client terminal 1A, which is the resource sharable terminal in the relay group the same as the client terminal 3A that has given the operation instruction and is connected to another LAN 1, can operate the resource (file001.xls). If both conditions (1) and (2) are met, the relay server R3 relays the operation instruction to the relay server R1 of another LAN 1 based on the relay group information 100, and the operation instruction is further relayed to the client terminal 1A.

Thus, the resource (file001.xls herein) can be shared or operated even if the client terminals 3A, 1A are connected to different LANs. The terminal that can exchange/the terminal that cannot exchange data over the LAN can be arbitrarily set by editing, etc., the resource sharable terminal information 110, and thus various modes of resource sharing can be realized according to the application and the purpose such as resource sharing only between managers of each branch office, etc.

Furthermore, the relay server R is configured to be able to add or delete the resource sharable terminal T in the relay group in the range of client terminals T connected to the LAN. In changing, the relay server R updates the resource sharable terminal information 110 stored in the relay group information database 505, and transmits a signal to other relay servers defining the relay group to update the resource sharable terminal information 110 stored in the relay group information database 505.

The client terminal T that carries out resource sharing over the LAN then can be freely changed in the range of the LAN, whereby a relay communication network having excellent flexibility can be realized. For instance, participation of the client terminal 1B of the sub-manager in resource sharing only in the Tokyo branch office, with respect to the resource sharing (sharing among client terminals 1A, 2A, 3A) carried out only between the managers of each branch office described above, can be easily achieved by simply operating the relay server R1 (specifically, executing addTerminal METHOD in the relay server R1) of the LAN 1 of the Tokyo branch office. Even in a case where the client terminal 2A used by a certain manager breaks down and needs to be repaired, and the client terminal 2B is meanwhile being used by the relevant manager, this can be easily responded to by operating the relay server R2.

As shown in FIG. 6, the relay group information database 505 is configured to store a plurality of relay group information 100a, 100b. The relay group information database 505 is configured to be able to store the same client terminal 1A as the resource sharable terminal in a plurality of relay groups, as shown in the example in FIG. 7.

Thus, a certain client terminal T can be used while switching the relay group (i.e., terminal configuration that carries out resource sharing over the LAN) according to the purpose and situation. For instance, the client terminal T used by the manager in charge of sales and marketing in the Tokyo branch office may, at times, belong to the relay group the same as the client terminal T in charge of sales and marketing in the Osaka branch office to share the sales and marketing data file, or may belong to the relay group the same as the client terminal T of the manager of each branch office to share manager conference material. Therefore, a highly convenient relay communication network can be realized.

Various preferred embodiments of the present invention have been described above, but the above configurations may be modified as below.

The resource sharable terminal information 110 may be configured to be stored in another appropriate database (resource sharable terminal information database) arranged in the relay server R instead of being stored with the relay group information 100 in the relay group information database 505. The resource sharable terminal information database may be arranged in the client terminal T, and the resource sharable terminal information 110 may be stored in the relevant database.

When relaying between different LANs as in the preferred embodiments described above, the number of LANs merely needs to be more than one, and is not limited to four as described above. A similar network other than the Internet may be used as the WAN.

A protocol other than the SIP may be used for the communication protocol between the external server S and each relay server R in the WAN, and for the communication protocol between the relay server R and the client terminal T, etc., in the LAN.

The external server S may be omitted and communication may be directly carried out between the relay servers R. In particular, if a protocol other than the SIP is used between the relay servers R, the communication between the relay servers R may be directly controlled based on the protocol, and thus the external server S can be easily omitted. The external server S is not limited to one, and may be a plurality.

The WAN interface 502 of the relay server R may be omitted. In this case, the connection with the Internet is performed by the router, and the relay server R may be arranged thereafter.

In the preferred embodiments described above, the client terminal T connected to the same LAN as the relay server R is stored in the account information database 504 of the relay server R. However, it is not limited thereto, and the client terminal T connected to the LAN different from its own device may be stored in the account information database 504. Furthermore, the relay server R and the client terminal T registered in the account information database 504 of the relay server R may have any relationship as long as they are able to communicate with each other through the network.

A plurality of relay servers R may be connected to the same LAN. For instance, a configuration in which three relay servers R are installed in the same LAN, some client terminals T in the LAN are stored in the account information database 504 of the first relay server R, other client terminals T are stored in the account information database 504 of the second relay server R, and further other client terminals T are stored in the third relay server R may be used. In this case, the three relay servers R communicate through the LAN and the relay is completed within one LAN.

While the present invention has been described with respect to preferred embodiments thereof, it will be apparent to those skilled in the art that the disclosed invention may be modified in numerous ways and may assume many preferred embodiments other than those specifically set out and described above. Accordingly, it is intended by the appended claims to cover all modifications of the present invention that fall within the true spirit and scope of the present invention.

What is claimed is:

1. A relay server including hardware and software and connected to a Local Area Network and communicable through a Wide Area Network with at least one other relay server connected to at least one other Local Area Network, the relay server comprising:
   an account information registration unit including hardware and software and arranged to store account information of a client terminal connected to the Local Area Network;
   a relay group information registration unit including hardware and software and arranged to store relay group information including:
      account information of a respective relay server of the at least one other relay server belonging to a relay group in which the relay server and the respective relay server permit connection with each other; and
      account information of a client terminal connected to the respective relay server through a respective Local Area Network of the at least one other Local Area Network;
   a relay group sharing unit including hardware and software and arranged to share the relay group information with other relay servers of the relay group; and
   a shared resource information registration unit including hardware and software and arranged to store, with respect to the relay group, shared resource information including:
      a name of a file or a folder of a shared resource;
      account information of a client terminal arranged to operate the shared resource; and
      account information of client terminals sharing the shared resource; wherein
   when the relay server receives an operation instruction for the shared resource from a client terminal stored in the account information registration unit, the relay server specifies a client terminal arranged to operate the shared resource and a relay server connected to the client terminal arranged to operate the shared resource based on both of the relay group information that is shared with the other relay servers of the relay group and the shared resource information, so as to relay the operation instruction from the client terminal stored in the account information registration unit to the specified client terminal arranged to operate the shared resource through the specified relay server connected to the specified client terminal arranged to operate the shared resource.

2. The relay server according to claim 1, wherein:
   the client terminal arranged to operate the shared resource is arranged to be changeable to a different one of the plurality of client terminals in the relay group; and
   when the client terminal arranged to operate the shared resource is changed, the relay server updates the shared resource information stored in the shared resource information registration unit, and transmits a signal to the other relay servers in the relay group to update the shared resource information.

3. The relay server according to claim 1, wherein:
   the relay group information stored in the relay group information registration unit includes information for a plurality of relay groups; and
   the client terminal arranged to operate the shared resource stored in the shared resource information registration unit is the same in each of the plurality of relay groups.

4. The relay server according to claim 3, wherein the shared resource information is contained in the relay group information.

5. The relay server according to claim 1, wherein the shared resource information is created based upon an instruction received from a client terminal stored in the account information registration unit.

6. The relay server according to claim 5, wherein, after creating the shared resource information, the shared resource information is shared with the other relay servers of the relay group.

7. The relay server according to claim 1, wherein, when shared resource information is received from one of the other relay servers of the relay group, the shared resource information is shared with a client terminal stored in the account information registration unit.

8. A relay communication system comprising:
   a plurality of relay servers, each of the plurality of relay servers includes hardware and software, is connected to a Local Area Network, and is arranged to communicate through a Wide Area Network with others of the plurality relay servers; and
   a plurality of client terminals, each of the plurality of client terminals is connected to a corresponding one of the plurality of relay servers through one of the corresponding Local Area Networks; wherein
   each of the plurality of relay servers includes:
      an account information registration unit including hardware and software and arranged to store account information of each of the plurality of client terminals connected to the relay server;
      a relay group information registration unit including hardware and software and arranged to store relay group information including:
         account information of each of the plurality of relay servers belonging to a relay group in which corresponding ones of the plurality of relay servers permit connection with each other; and
         account information of each of the plurality of client terminals connected to the corresponding ones of the plurality of relay servers in the relay group;
      a relay group sharing unit including hardware and software and arranged to share the relay group information with other relay servers of the relay group; and
      a shared resource information registration unit including hardware and software and arranged to store, with respect to the relay group, shared resource information including:
         a name of a file or a folder of a shared resource;
         account information of a client terminal arranged to operate the shared resource; and
         account information of client terminals sharing the shared resource; wherein
      when the relay server receives an operation instruction for the shared resource from a client terminal stored in the account information registration unit, the relay server specifies a client terminal arranged to operate the shared resource and a relay server connected to the client terminal arranged to operate the shared resource are specified based on both of the relay group information that is shared with the other relay servers of the relay group and the shared resource information, so as to relay the operation instruction from the client terminal stored in the account information registration unit to the specified client terminal arranged to operate the shared resource through the specified relay server connected to the specified client terminal arranged to operate the shared resource.

9. The relay communication system according to claim 8, wherein
the client terminal arranged to operate the shared resource is arranged to be changeable to a different one of the plurality of client terminals in the relay group; and
when the client terminal arranged to operate the shared resource is changed, the relay server updates the shared resource information stored in the shared resource information registration unit, and transmits a signal to the corresponding ones of the plurality of relay servers in the relay group to update the shared resource information.

10. The relay communication system according to claim 8, wherein
the relay group information stored in the relay group information registration unit includes information for a plurality of relay groups; and
the client terminal arranged to operate the shared resource stored in the shared resource information registration unit is the same in each of the plurality of relay groups.

11. The relay communication system according to claim 10, wherein the shared resource information is contained in the relay group information.

12. The relay communication system according to claim 8, wherein the shared resource information is created based upon an instruction received from a client terminal stored in the account information registration unit.

13. The relay communication system according to claim 12, wherein, after creating the shared resource information, the shared resource information is shared with the other relay servers of the relay group.

14. The relay communication system according to claim 8, wherein, when shared resource information is received from one of the other relay servers of the relay group, the shared resource information is shared with a client terminal stored in the account information registration unit.

* * * * *